United States Patent Office 3,770,713
Patented Nov. 6, 1973

3,770,713
OLEFIN POLYMERIZATION
Robert P. Zelinski and James N. Short, Bartlesville, Okla., Rudolph H. Gath, Ludwigshafen, Germany, and Ernest A. Zuech, Bartlesville, Okla., assignors to Phillips Petroleum Company
No Drawing. Continuation of abandoned application Ser. No. 788,014, Dec. 30, 1968. This application Dec. 13, 1971, Ser. No. 207,572
The portion of the term of the patent subsequent to Jan. 25, 1989, has been disclaimed
Int. Cl. C08f 1/56, 3/08
U.S. Cl. 260—93.7     6 Claims

ABSTRACT OF THE DISCLOSURE

Non-crystalline polymers are prepared by contacting a 1-olefin with a catalyst composed of (a) an organoaluminum compound, (b) a vanadium oxyhalide, and (c) a reaction product of a molybdenum trihalodicarboxylate and nitric oxide.

---

This application is a continuation of application Ser. No. 788,014 filed by Robert P. Zelinski on Dec. 30, 1968, now abandoned.

This invention relates to a polymerization process and has for an object the provision of a process for producing non-crystalline polymers of 1-olefins.

The art of polymerizing 1-olefins such as propylene, 1-butylene, 2-ethyl-1-hexene and the like is well developed. These monomers may be polymerized by contact with a catalyst usually in the liquid phase to produce elastomeric waxy materials which have many industrial applications. The tougher, stiffer products find extensive use in the manufacture of extruded articles such as pipe and containers of various types.

It is a further object of this invention to produce polymers of 1-olefins which are essentially non-crystalline in nature.

A still further object of this invention is the provision of a process for producing non-crystalline 1-olefin polymers which are suitable for use in a large number of industrial applications.

A still further object of this invention is the provision of a polymerization process which may be carried out in conventional equipment without the use of extreme conditions of temperature and pressure.

Further and additional objects will appear from the following description and the accompanying claims.

In accordance with this invention, a 1-olefin having from 3 to 8, inclusive, carbon atoms is polymerized by contact with a catalyst comprising an organoaluminum compound; and oxyhalide of vanadium; and a reaction product of nitric oxide and a molybdenum trihalodicarboxylate to produce a product which is characterized by its non-crystalline properties. Depending upon the choice of the 1-olefin and the degree of polymerization, the products of this invention may range from soft waxy materials to tough elastomeric substances. The soft waxy substances find use as potting compounds in the electrical industry while the tougher, stiffer products find use in the manufacture of molded articles such as pipe bowls and the like. Examples of suitable 1-olefins would include propylene, 1-butene, 1-hexene, 1-octene, 4-methyl-1-pentene and the like.

The catalyst used in the process of this invention comprises three essential ingredients. The first ingredient is an organoaluminum compound having the formula $R_mAlX_n$ wherein X is halogen, $m$ is the integer 2 or 3, $n$ is the integer 0 or 1, $m+n=3$, and each R is the same or a different hydrocarbon radical containing 1 to 12, inclusive, carbon atoms. Thus, X may be bromine, fluorine or iodine but is preferably chlorine; and R may be any alkyl, cycloalkyl or aromatic hydrocarbon radical such as methyl, ethyl, hexyl, dodecyl, phenyl, phenethyl, cyclohexyl, ethylcyclohexyl and the like. Specific examples of suitable organoaluminum compounds are trimethylaluminum, triethylaluminum, triisobutylaluminm, tri-n-octylaluminum, tridodecylaluminum, tricyclohexylaluminum, triphenylaluminum, dimethylaluminum chloride, diethylaluminum chloride, didodecylaluminum iodide, diphenylaluminum bromide, di(4-methylphenyl)aluminum bromide, and dicyclohexylaluminum fluoride. Mixtures of the aluminum compounds may also be used.

The second ingredient of the catalyst comprises a vanadium compound which is a vanadium oxyhalide or a mixture thereof. Suitable compounds include vanadium oxychloride, vanadium, oxydichloride, vanadium oxytrichloride, vanadium oxybromide, vanadium oxydibromide, vanadium oxytribromide, vanadium oxydifluoride and vanadium oxytrifluoride.

The third ingredient, namely the molybdenum-containing component of the catalyst used in the process of this invention is one which comprises the reaction product of nitric oxide (including nitric acid) with a molybdenum trihalodicarboxylate having the formula $MoX'_3(R'CO_2)_2$ in which X' is a halogen and R' is the same or a different hydrocarbon radical containing 1 to 20, inclusive, carbon atoms or mixtures thereof. Here again the halogen may be bromine, fluorine or iodine but is preferably chlorine.

The molybdenum trihalodicarboxylate may be prepared by reacting a molybdenum pentahalide, such as molybdenum pentachloride, with the appropriate organic acid having the formula R'COOH, the mole ratio of organic acid to the molybdenum pentahalide being about two-to-one. This reaction is preferably carried out in the presence of a non-polar diluent or solvent which does not contain an active hydrogen. Examples of said diluents include carbon tetrachloride, benzene, toluene, n-hexane, cyclohexane, ethylenedichloride, nitrobenzene and the like. The reaction may be conducted at a temperature of from about 25° C. to about 225° C. for a time of about 0.5 to about 150 hours. Any suitable organic acid, R'COOH, having from two to 20 carbon atoms may be used for preparing the dicarboxylate. It is preferred, however, that the organic acid be one in which the R' radical is aliphatic, alicyclic or aryl, or combinations thereof, containing from 6 to 17 carbon atoms. Examples of such are: acetic acid, butanoic acid, octanoic acid, decanoic acid, dodecanoic acid, hexadecanoic acid, octadecanoic acid, eicosanoic acid, cyclohexanecarboxylic acid, cyclododecanecarboxylic acid, benzoic acid, 1-naphthoic acid, 9-anthracenecarboxylic acid, 4-phenylbutanoic acid, 6-cyclopentyloctanoic acid, 4-ethylbenzoic acid, 4-cyclohexyl-1-naphthoic acid, and the like.

In order to prepare the nitric oxide complex of the molybdenum compound for use in the process of this invention, it is preferred to employ a molybdenum trihalodicarboxylate which is soluble in hydrocarbon diluents such as benzene, cyclohexane, hexane and the like. To prepare the complex a solution of the dicarboxylate in the hydrocarbon is saturated with excess nitric oxide by any convenient method such as bubbling nitric oxide gas through the solution or stirring the solution under positive nitric oxide pressure. The temperature employed for this nitric oxide saturation step can vary over a broad range but will generally be from about −20° C. to the boiling point of the solvent at atmospheric pressure, preferably 0° C. to 40° C. The time for the reaction will generally range from one minute to 24 hours, preferably ten minutes to four hours. Nitric oxide in excess of that required for saturation of the molybdenum compound can be removed by any convenient method such as subjecting the mixture to reduce pressure or repeated purging of the vapor space with an inert gas such as nitrogen.

The polymerization of the 1-olefins to produce the non-crystalline polymers by utilizing a mixture of the three catalyst ingredients above described can be carried out in the presence or absence of an inert diluent. Such diluents, if used, may be aliphatic, alicyclic or aromatic hydrocarbons such an n-butane, n-pentane, n-hexane, cyclohexane, dodecane and the like, or mixtures thereof. The temperature for polymerization is generally in the range of −50° C. to 200° C., preferably −20° C. to 50° C. The time of polymerization can be varied over a wide range, generally from five minutes to 24 hours but preferably from one hour to ten hours. The pressure employed in the polymerization will generally depend on the choice of 1-olefin, diluent and temperature. Preferably, the pressure will be sufficient to maintain the polymerization mixture in a predominantly liquid phase.

The polymerization reaction can be terminated by any convenient method, e.g., addition of isopropyl alcohol to deactivate the catalyst and the non-crystalline polymer can be recovered from the reaction mixtures by any convenient method. The choice of the method will generally depend on the amount and the molecular weight of the polymer. Polymer stabilizers can be added to the mixture prior to the isolation of the product. If so desired, the isolated product can be washed with acidic aqueous or non-aqueous solvents to remove catalyst residues. Finally, the product can be dried by any convenient method, e.g., heating under reduced pressure in a stream of inert gas.

The amounts and the relative proportions of the three ingredients of the catalyst may be varied over a relatively wide range and these amounts and proportions are conveniently expressed in terms of millimoles of ingredient per 100 grams of monomer subjected to the polymerization step. Suitably the concentration of the organoaluminum compound is within the range of 0.1 to 50 millimoles per 100 grams of monomer, preferably between 0.5 and 25 millimoles per 100 grams of monomer. Suitably the concentration of the vanadium compound is in the range of 0.05 and 20 millimoles, preferably between 0.2 and 10 millimoles, per 100 grams of the monomer. Suitably the concentration of the nitric oxide-molybdenum complex is in the range of 0.01 and 5, preferably 0.05 to 2.5, millimoles per 100 grams of monomer.

Reference will now be made to several specific examples for practicing this invention.

EXAMPLE 1

A cyclohexane-soluble molybdenum complex was prepared by mixing 0.18 mole of molybdenum pentachloride, 0.36 mole of stearic acid, and 500 milliliters of dry cyclohexane in a reactor for fifteen minutes while purging the reactor with nitrogen gas. The reactor was closed and the mixture agitated at 50° C. for one hour. Thereafter the reactor was opened, purged with nitrogen gas for an additional fifteen minutes, closed, and the mixture agitated again at 50° C. for fourteen hours. This solution was then transferred to a dry reactor which was then pressured to thirty pounds per square inch gauge with nitric oxide three successive times for thirty minutes each at room temperature thereby providing a cyclohexane solution containing 0.18 mole of the nitric oxide complex of molybdenum trichloride distearate.

Next, 800 parts by weight of cyclohexane and 100 parts by weight of propylene were charged to a dry reactor. Thereafter the nitric oxide-molybdenum complex (prepared as above described), vanadium oxytrichloride and triethylaluminum were added to the reactor in sequence. The amount of the molybdenum complex added was sufficient to provide a concentration of 1 millimole per 100 grams (2.38 moles) of the propylene monomer. The vanadium compound concentration was 4 millimoles per 100 grams of monomer and the concentration of the aluminum compound was 10 millimoles per 100 grams of propylene present. Thereafter the temperature of the reactor was adjusted to 30° C. and the reaction was continued for one hour with stirring. At the end of this time the reaction mixture was coagulated in isopropyl alcohol and the polymeric product was separated and dried by conventional procedures. The weight of the tough solid rubbery product produced represented a ten percent conversion of propylene to polymer and the product had an inert viscosity of 2.93 and a ten percent gel content, these properties being determined in accordance with the procedure in notes (a) and (b) appearing in column 20 of U.S. Pat. No. 3,278,508.

EXAMPLE 2

The process of Example 1 was repeated except that diethylaluminum chloride was substituted for the triethylaluminum. In this instance there was a 26 percent conversion, the product having 1.81 inherent viscosity and 0 percent gel.

EXAMPLE 3

The process of Example 1 was repeated in which 20 millimoles of triethylaluminum per 100 grams of propylene were used. In this instance there was a seven percent conversion to form a product having the inherent viscosity of 2.68 and 17 percent gel.

While several particular embodiments of this invention are described in the foregoing, it will be appreciated that many modifications may be made without departing from the spirit and scope of the appended claims.

What is claimed is:

1. A method of polymerizing an alipatic 1-olefin having 3 to 8, inclusive, carbon atoms to form a substantially non-crystalline polymer which comprises contacting said olefin with a catalyst comprising:
  (a) an organoaluminum component consisting essentially of a compound of the formula $R_mAlX_n$ wherein X is halogen, $m$ is the integer 2, or 3, $n$ is the integer 0 or 1, $m$ plus $n$ equals 3, and each R is the same or a different hydrocarbon radical containing 1 to 12, inclusive, carbon atoms or mixtures thereof;
  (b) a vanadium oxyhalide; and
  (c) a reaction product of nitric oxide and a molybdenum trihalodicarboxylate having the formula

$$MoX'_3(R'CO_2)_2$$

wherein X' is halogen and each R' is the same or a different hydrocarbon radical containing 1 to 20, inclusive, carbon atoms.

2. The process of claim 1 in which said contacting is effected in the presence of a liquid hydrocarbon diluent.

3. The process of claim 1 wherein X' is chlorine and each R' is the same or a different aliphatic, alicyclic or aryl hydrocarbon radical containing from 6 to 17, inclusive, carbon atoms.

4. The process of claim 1 wherein the ratio of the several catalyst ingredients (a), (b) and (c) to olefin being contacted expressed in millimoles of ingredient per 100 grams of olefin is as follows: ingredient (a) between about 0.1 and 50; ingredient (b) between about .05 and 20; and ingredient (c) between about .01 and 5.

5. The process of claim 4 in which the olefin is propylene and the contacting is effected in the presence of a liquid hydrocarbon diluent.

6. The process of claim 2 wherein X' is chlorine and each R' is the same or a different aliphatic, alicyclic or aryl hydrocarbon radical containing from 6 to 17, inclusive, carbon atoms.

References Cited
UNITED STATES PATENTS

| | | | |
|---|---|---|---|
| 3,637,627 | 1/1972 | Short et al. | 260—94.9 E |
| 3,507,843 | 4/1970 | Loveless | 260—94.9 C |
| 3,073,811 | 1/1963 | Natta et al. | 260—93.7 |
| 3,046,287 | 7/1962 | Larson | 260—429 |
| 3,197,452 | 7/1965 | Natta et al. | 260—93.7 |

JOSEPH L. SCHOFER, Primary Examiner
E. J. Smith, Assistant Examiner

U.S. Cl. X.R.

252—429 C, 431 C; 260—94.9 B